(12) United States Patent
Legare

(10) Patent No.: US 8,601,785 B2
(45) Date of Patent: Dec. 10, 2013

(54) OIL SUPPLY SYSTEM WITH MAIN PUMP DEAERATION

(75) Inventor: Pierre-Yves Legare, Chambly (CA)

(73) Assignee: Pratt & Whitney Canada Corp., Longueuil (CA)

( * ) Notice: Subject to any disclaimer, the term of this patent is extended or adjusted under 35 U.S.C. 154(b) by 840 days.

(21) Appl. No.: 12/821,218

(22) Filed: Jun. 23, 2010

(65) Prior Publication Data

US 2011/0314830 A1  Dec. 29, 2011

(51) Int. Cl.
F02C 7/26 (2006.01)
(52) U.S. Cl.
USPC ........................................ 60/39.08; 184/6.11
(58) Field of Classification Search
USPC ................. 60/39.08, 802; 184/6.11
See application file for complete search history.

(56) References Cited

U.S. PATENT DOCUMENTS

| | | | |
|---|---|---|---|
| 2,379,579 A | 7/1945 | Hunter | |
| 2,613,498 A | 10/1952 | Prendergast | |
| 2,983,331 A | 9/1961 | Helsley, Jr. | |
| 3,130,022 A * | 4/1964 | Clark | 96/187 |
| 3,415,383 A * | 12/1968 | Earle, Jr. et al. | 210/377 |
| 3,722,624 A | 3/1973 | Buckland | |
| 4,511,016 A * | 4/1985 | Doell | 60/39.08 |
| 4,531,358 A | 7/1985 | Smith | |
| 4,755,103 A | 7/1988 | Streifinger | |
| 4,793,440 A | 12/1988 | Iseman | |
| 4,947,963 A | 8/1990 | Aho, Jr. | |
| 5,114,446 A | 5/1992 | Giersdorf et al. | |
| 5,429,208 A * | 7/1995 | Largillier et al. | 60/39.08 |
| 5,450,835 A | 9/1995 | Wagner | |
| 6,398,833 B1 | 6/2002 | Santerre et al. | |
| 6,463,819 B1 * | 10/2002 | Rago | 184/6.2 |
| 7,063,734 B2 | 6/2006 | Latulipe et al. | |
| 7,225,626 B2 * | 6/2007 | Robinson et al. | 60/39.08 |
| 2009/0014245 A1 * | 1/2009 | Shevchenko et al. | 184/6.11 |
| 2009/0183950 A1 * | 7/2009 | Brouillet et al. | 184/6.24 |
| 2010/0028127 A1 * | 2/2010 | Cornet et al. | 184/6.11 |
| 2010/0229823 A1 * | 9/2010 | Gibson et al. | 96/215 |

* cited by examiner

Primary Examiner — Ted Kim
(74) Attorney, Agent, or Firm — Norton Rose Fulbright Canada LLP

(57) ABSTRACT

An oil supply system for a gas turbine engine with a centrifugal air/oil separator in fluid communication with the scavenge system to receive the used oil mixture and extract oil and air therefrom, a supply pump in serial connection with the main oil outlet of the separator and in fluid communication with the bearing cavities to deliver the oil thereto, an oil tank in fluid communication with the overflow oil outlet of the separator, and at least one make-up pump having an inlet in fluid communication with the tank and having an outlet in fluid communication with the scavenge system.

14 Claims, 3 Drawing Sheets

OIL SUPPLY SYSTEM WITH MAIN PUMP DEAERATION

TECHNICAL FIELD

The application relates generally to gas turbine engines and, more particularly, to oil supply systems for such engines.

BACKGROUND OF THE ART

In gas turbine engines, oil supply systems typically circulate the used oil mixture from the various enclosures requiring lubrication, such as the main bearing cavities, to the accessory gearbox cavity to reach the oil tank and/or directly to the oil tank, where the used oil mixture rests for a period of time in order to be sufficiently deaerated for recirculation. The deaerated oil is then typically circulated from the oil tank directly back to the enclosures, while the air separated from the used oil mixture circulates from the tank to the gearbox cavity, where it is vented to the atmosphere after having passing through a centrifugal breather to extract residual oil contained therein. The dwell time of the oil in the tank increases the quantity of oil necessary in the system, and as such the size of the tank required to contain it. This increases the overall weight of the engine, which is undesirable.

Known oil supply systems which are suitable for maneuvers at extreme attitudes, including negative gravity ("G") forces, comprise systems having two alternative oil circulation paths, combined with a valve or similar element which allows for the selection of one of the two circulation paths depending on the gravity experienced by the system. The addition of an alternate circulation path for extreme attitudes generally increases the complexity and weight of the system, and the valve or similar element may be prone to failure.

Accordingly, improvements are desirable.

SUMMARY

In one aspect, there is provided an oil supply system for supplying oil under pressure to enclosures of a gas turbine engine, the system comprising: a scavenge system in fluid communication with one or more of the enclosures to receive a used oil mixture therefrom; a main oil pump including a first stage and a second stage in serial communication with one another, the first stage including a centrifugal air/oil separator having an inlet in fluid communication with the scavenge system to receive the used oil mixture and separate oil and air contained therein, a main oil outlet located to discharge a major portion of the separated oil therethrough, an oil overflow outlet, and an air outlet in fluid communication with an air vent, the second stage including a second stage pump having an inlet in fluid communication with the main oil outlet of the centrifugal air/oil separator, and an outlet in fluid communication with the enclosures to circulate the oil thereto; and a make up system including a closed oil tank having a top inlet in fluid communication with the oil overflow outlet of the first stage of the main oil pump, the oil tank having at least one tank outlet located at a bottom thereof and in fluid communication with a make-up pump, the make up pump having an outlet in fluid communication with the scavenge system.

In another aspect, there is provided an oil supply system for a gas turbine engine, comprising a plurality of main bearing cavities each containing a main bearing supporting a main shaft of the gas turbine engine, a scavenge system in fluid communication with the main bearing cavities to receive a used oil mixture therefrom, a centrifugal air/oil separator having an inlet in fluid communication with the scavenge system to receive the used oil mixture and extract oil and air therefrom, an air outlet, a main oil outlet for delivering a major portion of the extracted oil, and an overflow oil outlet for delivering a remainder of the extracted oil, a supply pump having an inlet in serial connection with the main oil outlet of the separator and having an outlet in fluid communication with the plurality of bearing cavities to deliver the oil thereto, an oil tank in fluid communication with the overflow oil outlet of the separator, and at least one make-up pump having an inlet in fluid communication with the tank and having an outlet in fluid communication with the scavenge system.

In a further aspect, there is provided a method of supplying oil to main bearing cavities of a gas turbine engine, the method comprising: circulating a used oil mixture from the main bearing cavities directly to a first stage of a main pump without circulating the used oil mixture through an oil tank; deaerating the used oil mixture with the first stage of the main pump to produce an oil flow; circulating the oil flow from the first stage directly to a second stage of the main pump; and using the second stage to circulate the oil flow to the main bearing cavities.

DESCRIPTION OF THE DRAWINGS

Reference is now made to the accompanying figures in which.

DETAILED DESCRIPTION

Figure 1:
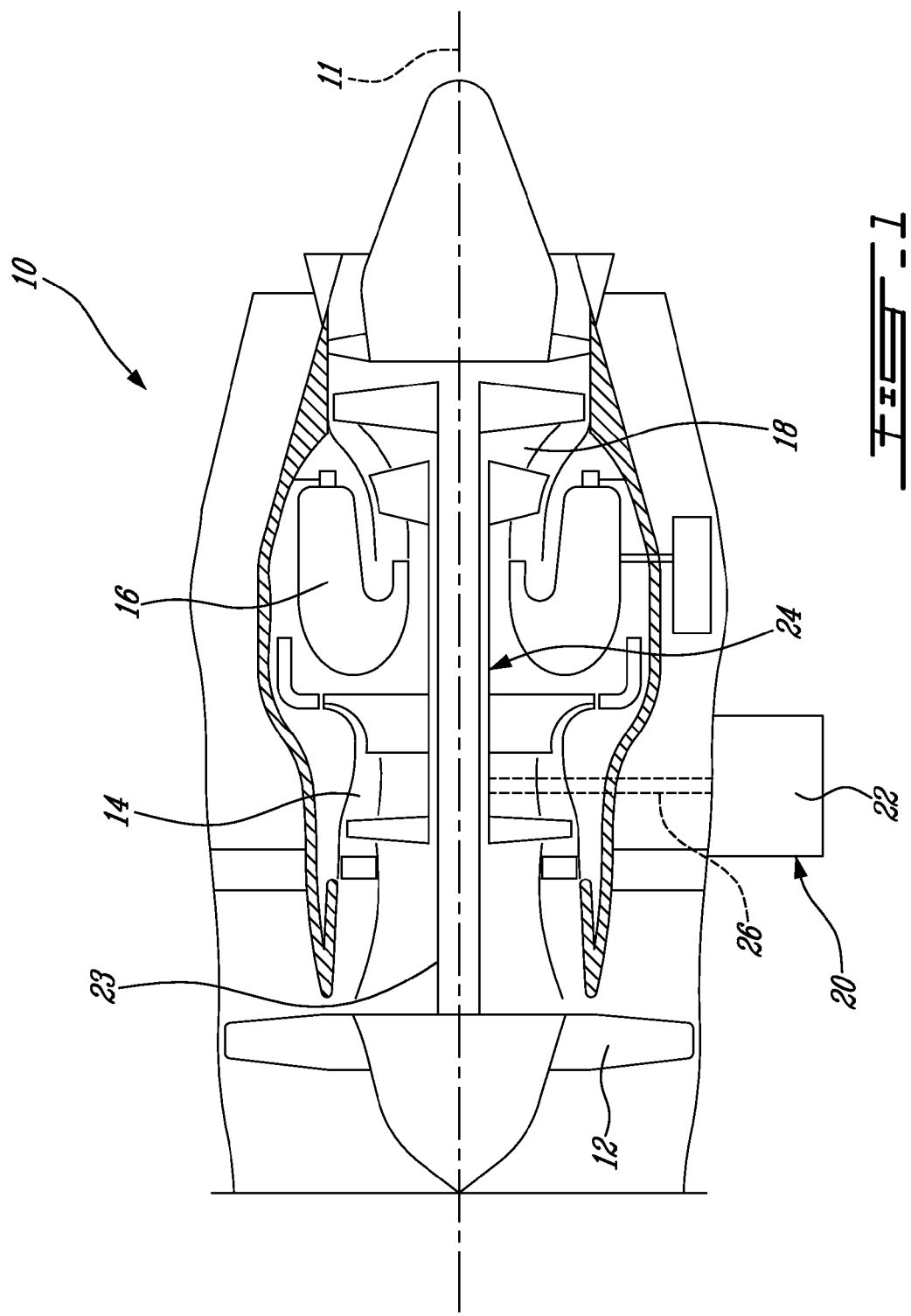
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

The fan 12 is drivingly interconnected to low pressure rotor(s) of the turbine section 18 through a low pressure shaft 23, and the high pressure rotor(s) of the compressor section 14 is/are drivingly connected to high pressure rotor(s) of the turbine section 18 through a high pressure shaft 24 concentrically surrounding the low pressure shaft 23.

The gas turbine engine includes an accessory drive assembly 20 which includes an accessory gearbox (AGB) 22. Although not shown, the accessory drive assembly 20 can also include a pump assembly and/or a starter generator. The accessory drive assembly 20 is driven by the high pressure shaft 24 via an accessory shaft 26 which drivingly interconnects the high pressure shaft 24 and the accessory gearbox 22.

Figure 2:
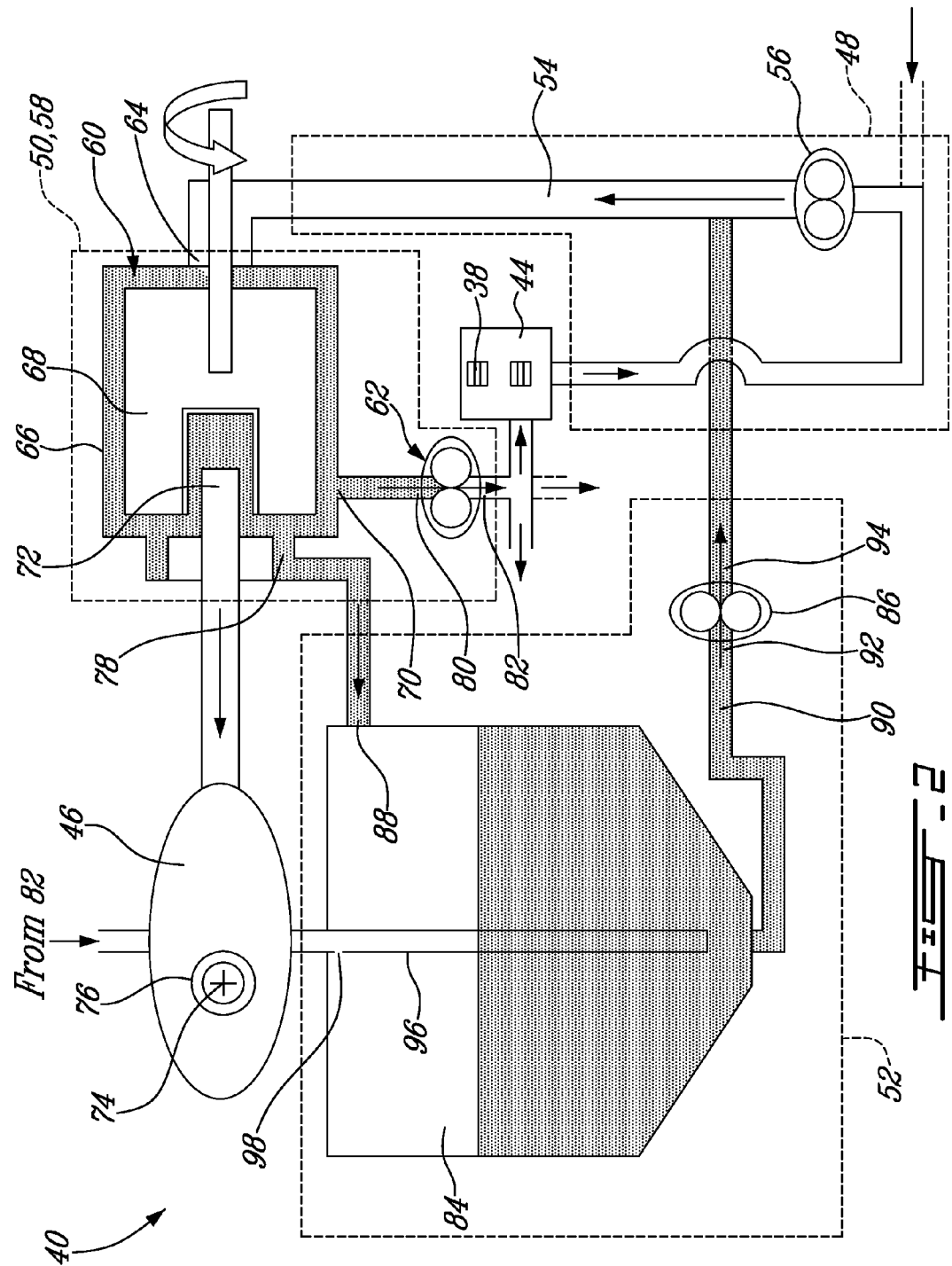
FIG. 2 is a schematic view of an oil supply system which can be used in a gas turbine engine such as shown in FIG. 1.

Referring to FIG. 2, the gas turbine engine 10 further includes an oil supply system 40 for lubricating and cooling rotating components of the engine 10, such as for example the main bearings 38 supporting the low and high pressure shafts 23, 24 and the gears of the accessory gearbox 22 (see FIG. 1). The oil supply system 40 includes partial or complete enclosures each defining a cavity containing at least one respective rotating component requiring lubrication. The enclosures or cavities include main bearing cavities 44 (only one of which is shown) each containing at least one of the main bearings 38, an accessory gearbox cavity 46 defined by the casing of the accessory gearbox 22, and optionally one or more cavities (not shown) each containing one of any other rotating component of the engine requiring lubrication.

The oil supply system 40 includes a scavenge system 48, a distribution and deaeration system 50, and a make-up system 52.

The scavenge system 48 includes a scavenge line 54 in fluid communication with the main bearing cavities 44 for receiving the used oil mixture therefrom. Although the used oil mixture may circulate through the scavenge line with the help of gravity and/or blowdown, in the embodiment shown, the scavenge system 48 includes at least one scavenge pump 56 (only one of which is shown) to actively circulate the used oil mixture coming from the cavities 44 through the scavenge line 54. The scavenge system 48 is also in fluid communication with the distribution and deaeration system 50 and the make-up system 52, as will be further detailed below.

The distribution and deaeration system 50 includes a main oil pump 58 which includes a first stage 60 and a second stage 62 in serial communication with one another. The first stage 60 is a centrifugal air/oil separator, which has an inlet 64 defined at its proximal end in fluid communication with the scavenge line 54. The air/oil separator 60 includes a casing with a cylindrical outer wall 66 containing and surrounding a rotating component 68 which induces a rotation to the used oil mixture. The centrifugal motion brings the heavier oil near the outer wall 66 of the casing while the lighter air remains at the center. A main oil outlet 70 is defined in the outer wall 66 near the distal end and is in fluid communication with the second stage 62 of the main pump 58, such that a major portion of the separated oil is circulated therethrough from the air/oil separator 60 to the second stage 62. The separator 60 thus acts as a centrifugal pump delivering the separated oil to the second stage 62.

The air/oil separator 60 also includes an oil overflow outlet 78 defined at its distal end, at an intermediate radial position between the air outlet 72 and the main oil outlet 70. The oil overflow outlet 78 is in fluid communication with the make-up system 52, such that the excess separated oil is discharged thereto.

The air/oil separator 60 further includes a central air outlet 72 defined at its distal end, which is in fluid communication with an air vent 74 to atmosphere. In a particular embodiment, the air outlet 72 is in fluid communication with the air vent 74 through a breather 76 of the engine, for example a centrifugal breather, contained in the accessory gearbox cavity 46. The breather 76 is a second air/oil separator which is designed to remove a small quantity of oil remaining in an air flow, as opposed to the separator 60 of the main pump 58 which is designed to remove a small quantity of air from an oil mixture. The centrifugal breather 76 thus has a different structure than that of the air/oil separator 60, and may include for example a rotating metallic mesh element which is not contained in a casing, such that the residual oil is expelled radially therefrom to fall to the bottom of the accessory gearbox cavity 46.

The second stage 62 of the main oil pump 58 is a supply pump having an inlet 80 in fluid communication with the main oil outlet 70 of the air/oil separator 60 of the first stage, and an outlet 82 in fluid communication with each of the cavities 44, 46 requiring lubrication (which may include other enclosures not shown), such that the supply pump 62 circulates the deaerated oil from the air/oil separator 60 to the various cavities 44, 46.

In a particular embodiment, both stages 60, 62 of the main pump 58 are mounted on a common shaft, and may be contained in the same casing. Alternately, both stages 60, 62 of the main pump 58 may be driven by different shafts for packaging reasons.

The make-up system 52 includes a tank 84 and a make-up pump 86. The tank 84 includes a top inlet 88 in fluid communication with the oil overflow outlet 78 of the air/oil separator 60, and a bottom outlet 90. In the embodiment shown, the make-up system 52 also scavenges the accessory gearbox cavity 46, and the accessory gearbox cavity 46 is disposed above the tank 84. A conduit 96 is provided between the accessory gearbox cavity 46 and the tank 84 such that the used oil mixture from the accessory gearbox cavity 46 is directed to the tank 84 through the conduit 96 by gravity. The conduit 96 includes a small vent 98 above the liquid interface in the tank 84 such that excess air from the tank 84 may circulate up to the accessory gearbox cavity 46 through the vent 98 and conduit 96. The small vent 98 which minimizes oil transfer to the accessory gearbox cavity 46 from the tank 84, as well as the fact that the accessory gearbox cavity 46 is not in fluid communication with the scavenge system 48, help prevent flooding of the accessory gearbox cavity 46 when the engine 10 is subjected to negative G's.

Since the used oil mixture is deaerated by the first stage 60 of the main pump 58, dwelling of the oil mixture in the tank 84 is not necessary to remove the air therefrom. Accordingly, the tank 84 is sized to cope with oil gulping upon starting of the engine, oil consumption during flight and oil thermal expansion, but dwell time does not need to be considered. The tank 84 may thus be much smaller than standard oil tanks and the quantity of oil carried much smaller as well, which advantageously helps to reduce both the engine dry and wet weight.

In an alternate embodiment which is not shown, the accessory gearbox cavity 46 is in fluid communication with the scavenge system 48, such that the used oil mixture from the accessory gearbox cavity 46 is returned to the main pump 58 by the scavenge pump(s) 56 through the scavenge line 54. In this alternate embodiment, the accessory gearbox cavity 46 does not need to be disposed above the tank 84. The accessory gearbox cavity 46 is also in fluid communication with the tank 84 through the conduit 96 which in this alternate configuration is connected to the top of the accessory gearbox cavity 46, preventing used oil mixture from the accessory gearbox cavity 46 to flow directly to the tank 84. Similarly to the embodiment shown, the conduit 96 includes a small vent 98 above the liquid interface in the tank 84 such that excess air from the tank 84 may flow to the accessory gearbox cavity 46 through the vent 98 and the conduit 96, and the conduit 96 extends below the liquid interface to the bottom of the tank 84 such that excess air from the tank 84 may flow to the accessory gearbox cavity 46 through the conduit 96 when the engine 10 is subjected to negative G's. The small vent 98 minimizes oil transfer from the tank 84 to the accessory gearbox cavity 46 and helps to prevent flooding of the accessory gearbox cavity 46 when the engine 10 is subjected to negative G's.

The make-up pump 86 has an inlet 92 in fluid communication with the bottom outlet 90 of the tank 84, and an outlet 94 in fluid communication with the scavenge system 48 and more particularly, the scavenge line 54. The make-up pump 86 ensures that an adequate flow of used oil mixture is provided at all times to the first stage 60 of the main oil pump 58. In a particular embodiment, the flow provided by the make-up pump 86 represents a fraction of the flow entering the main oil pump 58, for example 10% thereof.

In a particular embodiment, the make-up pump 86, supply pump 62 and scavenge pump(s) 56 are all driven by the same shaft. In an alternate embodiment, the make-up pump 86 is an electric pump or is driven by a different shaft.

Centrifugal air/oil separators or pumps may be sensitive to loosing priming if air is introduced in the inlet conduit, for example through interruption of the oil flow caused by a zero G or negative G manoeuvre. However, in a particular embodiment, the make-up pump 86, scavenge pump(s) 56 and supply pump 62 are all positive displacement pumps, thus continue to work even if there is an interruption of the oil flow. As such, the make-up pump 86 and scavenge pump(s) 56 push the used oil mixture through the air/oil separator 60, while the supply pump 62 sucks the separated oil out of it, thus re-priming the air/oil separator 60 if it looses priming. The oil supply system 40 may therefore be used under positive, zero and/or negative gravity, using the same oil/used oil mixture circulation path(s) in all gravity conditions, thus eliminating the need for a valve or similar element to re-configure the system 40 every time the gravity conditions change.

In a particular embodiment, the make-up pump 86, scavenge pump(s) 56 and/or supply pump 62 is/are positive displacement pump(s), more particularly gear pump(s), vane pump(s) or gerotor pump(s).

Although not shown, adequate filtering element(s) may be provided throughout the circulation path(s) of the oil/used oil mixture to ensure proper removal of contaminants from the oil supply system.

As the oil absorbs heat energy produced in the main bearing cavities 44 by the very high speed rotation of the main shaft of the aircraft engine, and the oil further mixes with the relatively hot compressed air streams, the used oil mixture from the main bearing cavities 44 is hot and an adequate heat exchange system (not shown) may be provided, for example between the two stages 60, 62 of the main pump 58, or between the second stage 62 of the main pump 58 and the cavities 44, 46, such that the separated oil may circulate therethrough for cooling. Alternatively, the heat exchange system may be located between the scavenge system 48 and the air/oil separator 60, such that the used oil mixture may circulate therethrough for cooling.

Figure 3:
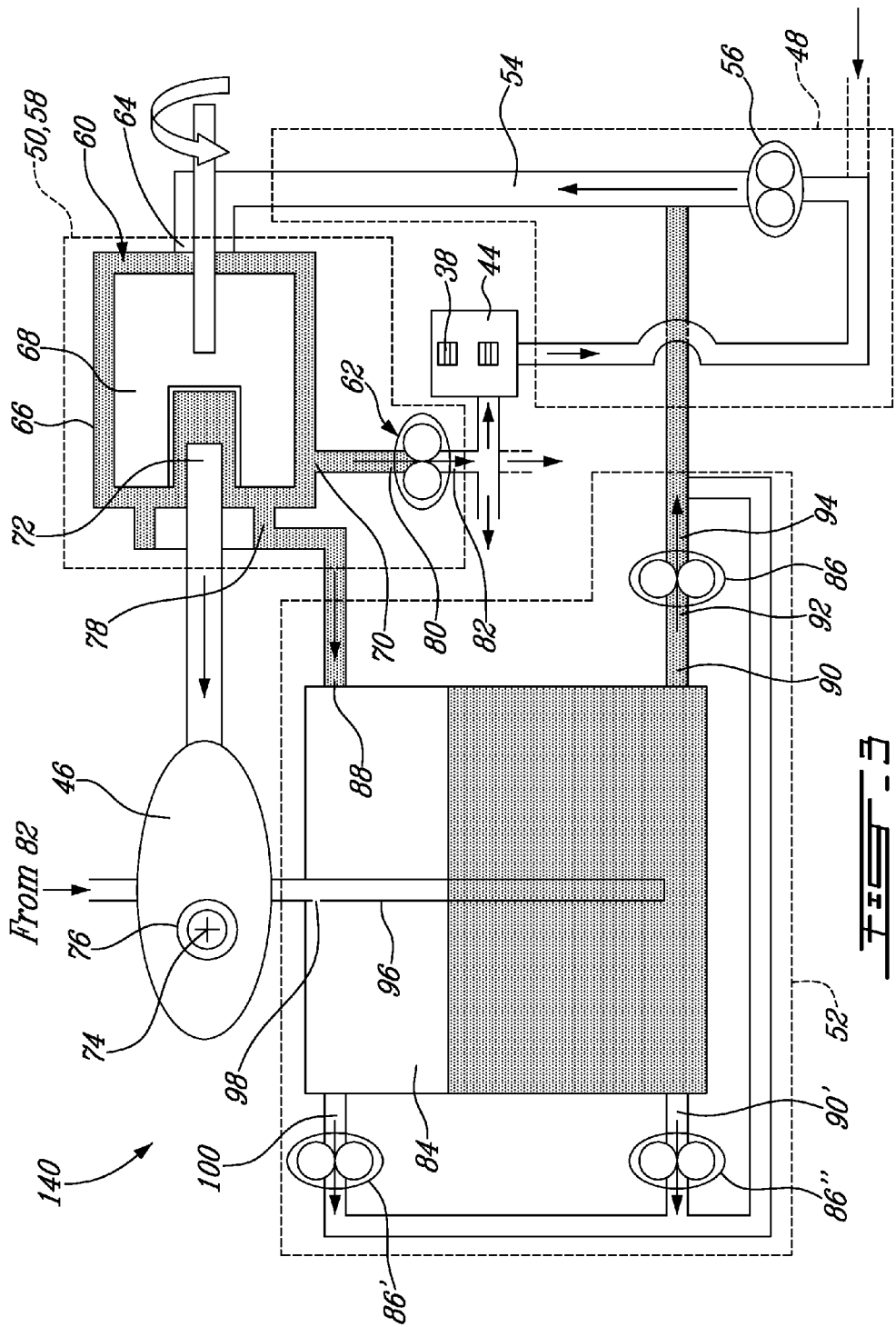
FIG. 3 is a schematic view of an alternate oil supply system which can be used in a gas turbine engine such as shown in FIG. 1.

Referring to FIG. 3, an alternate oil supply system 140 is shown, including all the elements of the above described system 40, which are designated by the same reference numerals and will not be further described herein. However, the tank 84 further includes a top outlet 100 connected to a first additional make-up pump 86', and an additional bottom outlet 90' opposite the bottom outlet 90, connected to a second additional make-up pump 86", with all make-up pumps 86, 86', 86" being connected to the scavenge system 48 and more particularly to the scavenge line 54. The second bottom outlet 90' and second additional make-up pump 86" provide for aggressive attitude requirements, while the top outlet 100 and first additional make-up pump 86' provide for continuous operation in inverted flight. The oil supply system 140 thus provides for improved performances under aggressive attitude changes, and zero and/or negative gravity.

In use, during the lubrication of the main bearing cavities 44, the oil is mixed with compressed air streams used to pressurize air seals of the main bearing cavities, resulting in a used oil mixture containing air trapped therein. In order to remove the air contained in the used oil mixture, the used oil mixture from the main bearing cavities 44 is circulated by the scavenge system 48, through the scavenge line 54 and scavenge pump(s) 56, to the air/oil separator 60 forming the first stage of the main oil pump 58, where air and oil from the used oil mixture are separated. The major portion of the separated oil is circulated from the first stage 60 to the second stage 62 of the main pump 58. The air extracted from the used oil mixture by the air/oil separator 60 is circulated via the air outlet 72 to the accessory gearbox cavity 46, where it exits through the air vent 74 after having circulated through the breather 76 to remove residual oil contained therein.

The first stage 60 of the main pump 58 boosts the pressure in the inlet 80 of the second stage supply pump 62, which advantageously allows for the use of a smaller and higher speed supply pump 62 to achieve the same pump capacity without oil cavitation problems. Driving the supply pump 62 at a higher speed may help reduce the accessory gear box gear train size and save weight. In addition, systems in which the supply pump circulates oil from the tank to the cavities generally require the tank and accessory gearbox cavity to be pressurized to raise the pressure at the inlet of the supply pump. In the present system, the tank 84 and accessory gearbox cavity 46 do not need to be pressurized. A non pressurized tank and accessory gearbox cavity may improve the scavenging of the low pressure bearing cavities, reduce casing stress, and reduce external oil leak via accessory mounting pads.

The second stage supply pump 62 circulates the separated oil to the bearing and accessory gearbox cavities 44, 46 without passing through the tank 84. The used oil mixture from the main bearing cavities 44 is then circulated by the scavenge system 48 back to the first stage 60 of the main pump 58, also without passing through the tank 84. As such, a main oil flow path is defined from the main bearing cavities 44 to the main pump 58 and back to the main bearing cavities 44 without including the tank 84. The air/oil separator 60 provides adequate deaeration of the used oil mixture such that dwell time in the tank 84 is not necessary to ensure adequate air extraction.

In the embodiment shown, the used oil mixture from the accessory gearbox cavity 46 returns to the scavenge system 48 after having circulated through the tank 84. However, since it is circulated from the tank 84 to the scavenge system 48 (as opposed to directly to the main pump 58), dwell time in the tank 84 is not necessary here either, as the tank 84 merely serves to provide a connection between the accessory gearbox cavity 46 and the scavenge system 48. In an alternate embodiment, as mentioned above, the used oil mixture from the accessory gearbox cavity 46 returns directly to the scavenge system 48, i.e. without circulating through the make-up system 52 including the tank 84, similarly to the used oil mixture from the main bearing cavities 44.

Overflow oil from the air/oil separator 60 and used oil mixture from the accessory gearbox cavity 46 are received in the make-up system 52 and mixed together in the tank 84, and as such a used oil mixture is delivered by the make-up pump(s) 86, 86', 86" from the tank 84 to the scavenge system 48 to provide an adequate flow to the first stage 60 of the main pump 58. The flow provided by the make-up system 52 is adjusted to ensure that the air/oil separator 60 receives a flow of used oil mixture which is slightly superior to the oil flow required by the second stage pump 62 to supply oil to the various cavities 44, 46.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. An oil supply system for supplying oil under pressure to enclosures of a gas turbine engine, the system comprising:
a scavenge system in fluid communication with one or more of the enclosures to receive a used oil mixture therefrom;
a main oil pump including a first stage and a second stage in serial communication with one another,
the first stage including a centrifugal air/oil separator having an inlet in fluid communication with the scavenge system to receive the used oil mixture and separate oil and air contained therein, a main oil outlet located to discharge a major portion of the separated oil therethrough, an oil overflow outlet, and an air outlet in fluid communication with an air vent,
the second stage including a second stage pump having an inlet in fluid communication with the main oil outlet of the centrifugal air/oil separator, and an outlet in fluid communication with the enclosures to circulate the oil thereto; and
a make up system including a closed oil tank having a top inlet in fluid communication with the oil overflow outlet of the first stage of the main oil pump, the oil tank having at least one tank outlet located at a bottom thereof and in fluid communication with a make-up pump, the make up pump having an outlet in fluid communication with the scavenge system.

2. The system as defined in claim 1, wherein the scavenge system includes a scavenge line in fluid communication with the enclosures through at least one scavenge pump.

3. The system as defined in claim 1, wherein the make-up pump and the second stage pump are positive displacement pumps.

4. The system as defined in claim 1, wherein the make-up pump and the second stage pump are driven by a common shaft.

5. The system as defined in claim 1, wherein the make-up pump is an electric pump.

6. The system as defined in claim 1, wherein the air outlet of the centrifugal air/oil separator is in fluid communication with the air vent through a breather of the gas turbine engine which removes residual oil from the air.

7. The system as defined in claim 6, wherein the breather is located in an accessory gearbox enclosure surrounding an accessory gearbox of the engine and the main oil pump is located outside the accessory gearbox enclosure.

8. The system as defined in claim 7, wherein the accessory gearbox enclosure is in fluid communication with the outlet of the second stage pump, the accessory gearbox enclosure being disposed over and in fluid communication with the oil tank such that used oil from the accessory gearbox enclosure is circulated to the oil tank by gravity and returned to the scavenge system by the make up pump.

9. The system as defined in claim 8, wherein the fluid communication between the accessory gearbox enclosure and the oil tank is provided by a conduit extending therebetween, the conduit having an air vent defined therethrough within the oil tank and above a liquid interface of the oil tank.

10. An oil supply system for a gas turbine engine, comprising:
a plurality of main bearing cavities each containing a main bearing supporting a main shaft of the gas turbine engine;
a scavenge system in fluid communication with the main bearing cavities to receive a used oil mixture therefrom;
a centrifugal air/oil separator having an inlet in fluid communication with the scavenge system to receive the used oil mixture and extract oil and air therefrom, an air outlet, a main oil outlet for delivering a major portion of the extracted oil, and an overflow oil outlet for delivering a remainder of the extracted oil;
a supply pump having an inlet in serial connection with the main oil outlet of the separator and having an outlet in fluid communication with the plurality of bearing cavities to deliver the oil thereto;
an oil tank in fluid communication with the overflow oil outlet of the separator; and
at least one make-up pump having an inlet in fluid communication with the tank and having an outlet in fluid communication with the scavenge system.

11. The system as defined in claim 10, wherein the scavenge system includes a scavenge line in fluid communication with the bearing cavities through at least one scavenge pump.

12. The system as defined in claim 10, wherein the make-up pump and the supply pump are positive displacement pumps.

13. The system as defined in claim 10, wherein the make-up pump and the supply pump are in driving engagement with a common shaft, which is in driving engagement with the accessory gearbox.

14. The system as defined in claim 10, wherein the air outlet of the separator is in fluid communication with an air vent through a breather of the gas turbine engine for removing residual oil from the air.

* * * * *